(12) United States Patent
Yashiki et al.

(10) Patent No.: US 8,054,550 B2
(45) Date of Patent: Nov. 8, 2011

(54) OPTICAL DEVICE, LAMINATE AND LABELED ARTICLE

(75) Inventors: Kazuhiro Yashiki, Tokyo (JP); Naoaki Shindou, Tokyo (JP); Noriyuki Itou, Tokyo (JP); Hidetaka Ide, Tokyo (JP); Naoki Minamikawa, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/659,726

(22) Filed: Mar. 18, 2010

(65) Prior Publication Data

US 2010/0177391 A1 Jul. 15, 2010

Related U.S. Application Data

(63) Continuation of application No. PCT/JP2008/067032, filed on Sep. 19, 2008.

(30) Foreign Application Priority Data

Sep. 20, 2007 (JP) .................................. 2007-243682
Oct. 19, 2007 (JP) .................................. 2007-272409

(51) Int. Cl.
*G02B 5/18* (2006.01)
(52) U.S. Cl. ..................... 359/572; 359/566; 359/558
(58) Field of Classification Search .................. 359/572, 359/558, 566
See application file for complete search history.

(56) References Cited

U.S. PATENT DOCUMENTS

| 5,673,148 A | 9/1997 | Morris et al. |
| 7,787,182 B2 * | 8/2010 | Stuck et al. .................. 359/569 |
| 2003/0058491 A1 * | 3/2003 | Holmes et al. .................... 359/2 |
| 2006/0263539 A1 | 11/2006 | Argoitia |
| 2007/0081246 A1 | 4/2007 | Stuck et al. |

FOREIGN PATENT DOCUMENTS

| JP | 6-68051 | 9/1994 |
| JP | 7-110476 | 4/1995 |
| JP | 8-234007 | 9/1996 |
| JP | 9-68926 | 3/1997 |
| JP | 9-68927 | 3/1997 |
| JP | 10-250214 | 9/1998 |
| JP | 11-291609 | 10/1999 |
| JP | 2000-221898 | 8/2000 |
| JP | 2001-13415 | 1/2001 |
| JP | 2002-40219 | 2/2002 |
| JP | 2002-530687 | 9/2002 |

(Continued)

OTHER PUBLICATIONS

International Search Report for PCT/JP2008/067032, mailed on Dec. 9, 2008.

(Continued)

*Primary Examiner* — Joshua L Pritchett

(57) ABSTRACT

A special visual effect is achieved. An optical device includes a light-reflecting interface provided with a first relief structure including first recesses or protrusions arranged two-dimensionally, the first relief structure emitting a first diffracted light when illuminated with a light, and a light-transmitting interface disposed in front of the light-reflecting interface and having a reflectance smaller than that of the first interface, the light-transmitting interface being provided with a second relief structure including second recesses or protrusions arranged two-dimensionally, and the second relief structure emitting a second diffracted light when illuminated with the light.

3 Claims, 9 Drawing Sheets

FOREIGN PATENT DOCUMENTS

| | | |
|---|---|---|
| JP | 2003-211572 | 7/2003 |
| JP | 2004-90381 | 3/2004 |
| JP | 2004-117683 | 4/2004 |
| JP | 2004-122690 | 4/2004 |
| JP | 2004-151334 | 5/2004 |
| JP | 2004-181791 | 7/2004 |
| JP | 2004-205990 | 7/2004 |
| JP | 2005-10231 | 1/2005 |
| JP | 2005-91786 | 4/2005 |
| JP | 2005-103980 | 4/2005 |
| JP | 2005-230947 | 9/2005 |
| JP | 2007-65673 | 3/2007 |
| JP | 2007-171647 | 7/2007 |
| RU | 2 328 760 C2 | 7/2008 |

OTHER PUBLICATIONS

English Translation of the International Preliminary Report on Patentability mailed Apr. 15, 2010 in corresponding International Patent Application PCT/JP2008/067032.

Office Action mailed from the Canadian Intellectual Property Office on Mar. 7, 2011 in the corresponding Canadian patent application.

"Polytechnic Dictionary", edited by A. Yu. Ishlinsky, Moscow, Soviet Encyclopedia, 1989, p. 391.

Office Action issued by the Russian Intellectual Property Office on Jun. 27, 2011 in the corresponding Russian patent application.

Office Action mailed from the Korean Intellectual Property Office on Jun. 30, 2011 in the corresponding Korean patent application.

* cited by examiner

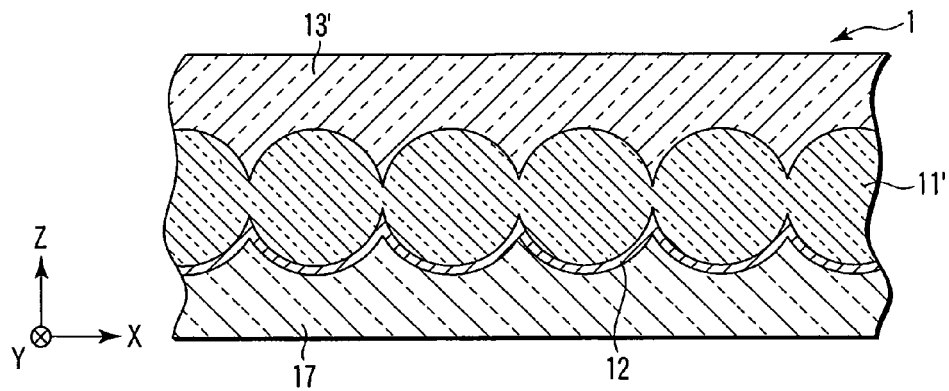
F I G. 11
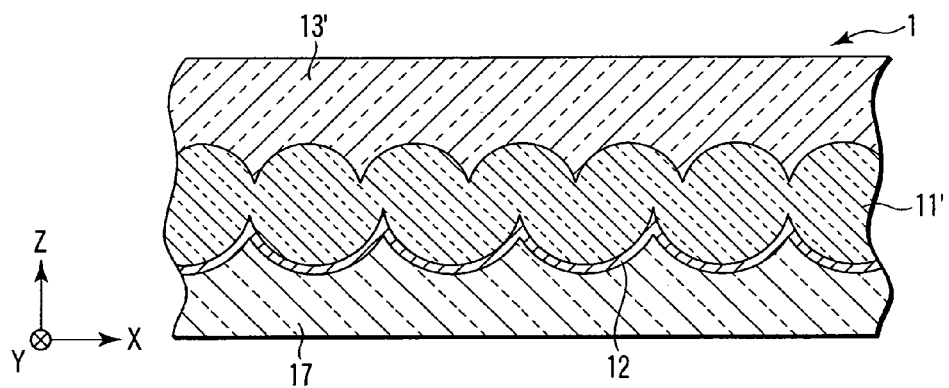
F I G. 12
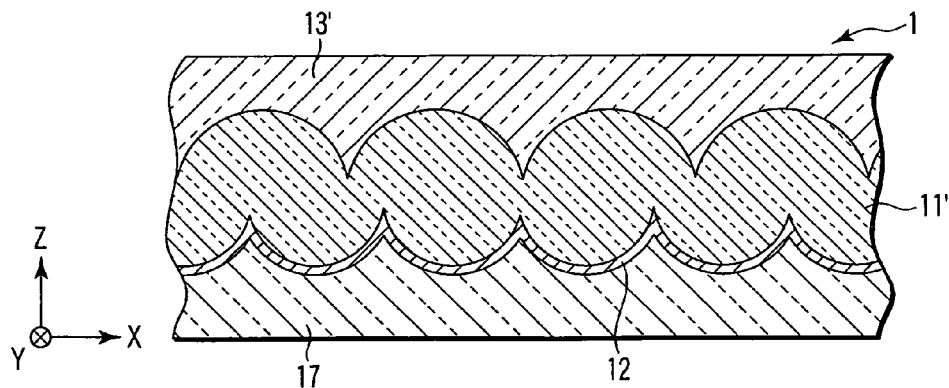
F I G. 13

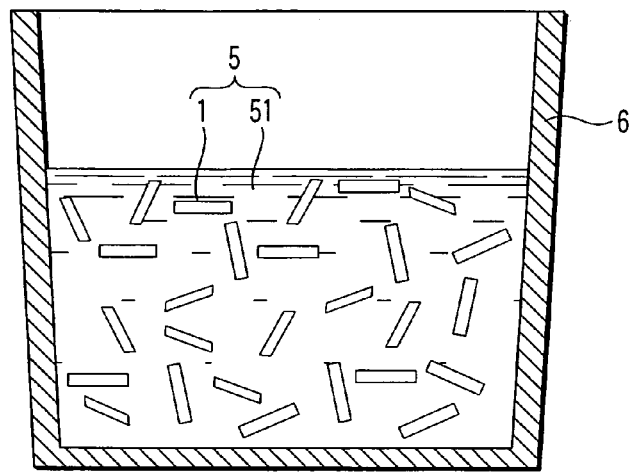
F I G. 19
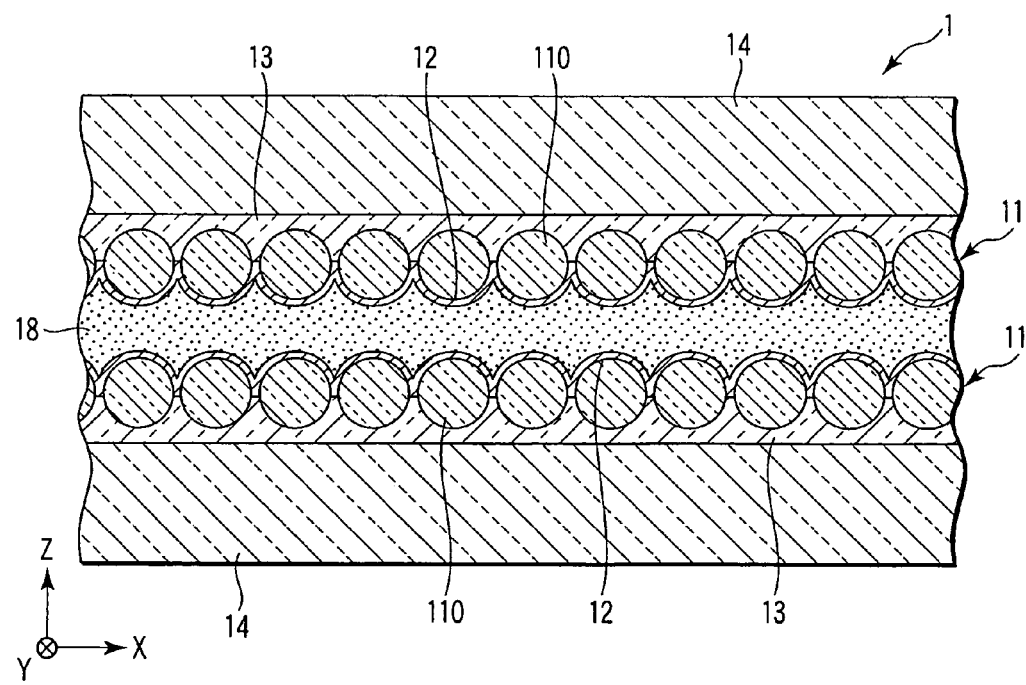
F I G. 20

OPTICAL DEVICE, LAMINATE AND LABELED ARTICLE

CROSS REFERENCE TO RELATED APPLICATIONS

This application is a U.S. Continuation Application claiming priority benefit under 35 U.S.C. Section 111(a), of PCT International Application No. PCT/JP2008/067032, filed Sep. 19, 2008, which claims priority benefit to Japanese Application Nos. 2007-243682, filed Sep. 20, 2007, and 2007-272409, filed Oct. 19, 2007, the entire disclosures of which are incorporated by reference as a part of this application.

BACKGROUND OF THE INVENTION

1. Field of the Invention

The present invention relates to an optical technique.

2. Description of the Related Art

An optical device including a hologram or diffraction grating is utilized in various applications. For example, Jpn. Pat. Appln. KOKAI Publication No. 2005-091786 describes that an optical device including a hologram is used for the purpose of forgery prevention.

BRIEF SUMMARY OF THE INVENTION

An object of the present invention is to achieve a special visual effect.

According to a first aspect of the present invention, there is provided an optical device comprising a light-reflecting interface provided with a first relief structure including first recesses or protrusions arranged two-dimensionally, the first relief structure emitting a first diffracted light when illuminated with a light, and a light-transmitting interface disposed in front of the light-reflecting interface and having a reflectance smaller than that of the first interface, the light-transmitting interface being provided with a second relief structure including second recesses or protrusions arranged two-dimensionally, and the second relief structure emitting a second diffracted light when illuminated with the light.

According to a second aspect of the present invention, there is provided a laminate comprising the optical device according to the first aspect, and a support facing the light-reflecting interface with the light-transmitting interface interposed therebetween and releasably supporting the optical device.

According to a third aspect of the present invention, there is provided a labeled article comprising the optical device according to the first aspect, and an article facing the light-transmitting interface with the light-reflecting interface interposed therebetween and supporting the optical device.

BRIEF DESCRIPTION OF THE SEVERAL VIEWS OF THE DRAWING

FIG. 11 is a plan view schematically showing an optical device according to another embodiment of the present invention;

FIG. 12 is a sectional view schematically showing a modified example of the optical device shown in FIG. 11;

FIG. 13 is a sectional view schematically showing another modified example of the optical device shown in FIG. 11;

FIG. 19 is a sectional view schematically showing an example of an ink; and

FIG. 20 is a sectional view schematically showing an optical device according to still another embodiment of the present invention.

DETAILED DESCRIPTION OF THE INVENTION

Figure 1:
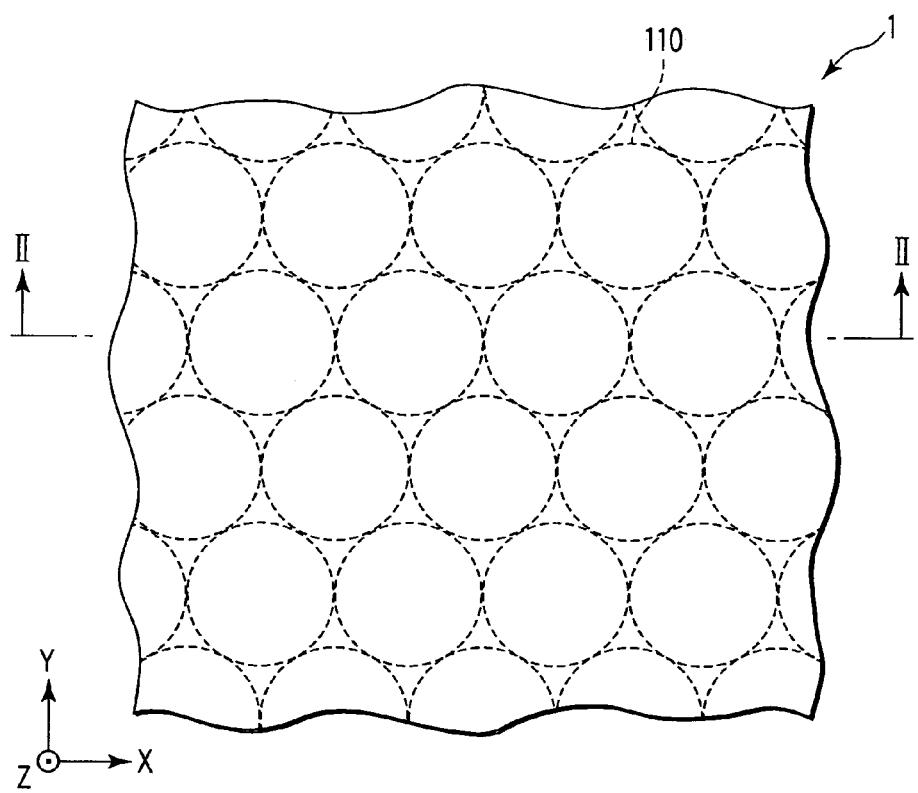
FIG. 1 is a plan view schematically showing an optical device according to an embodiment of the present invention.

Embodiments of the present invention will be described below. Note that the same reference numerals in the drawings denote components that achieve the same or similar functions, and a repetitive explanation thereof will be omitted.

Figure 2:
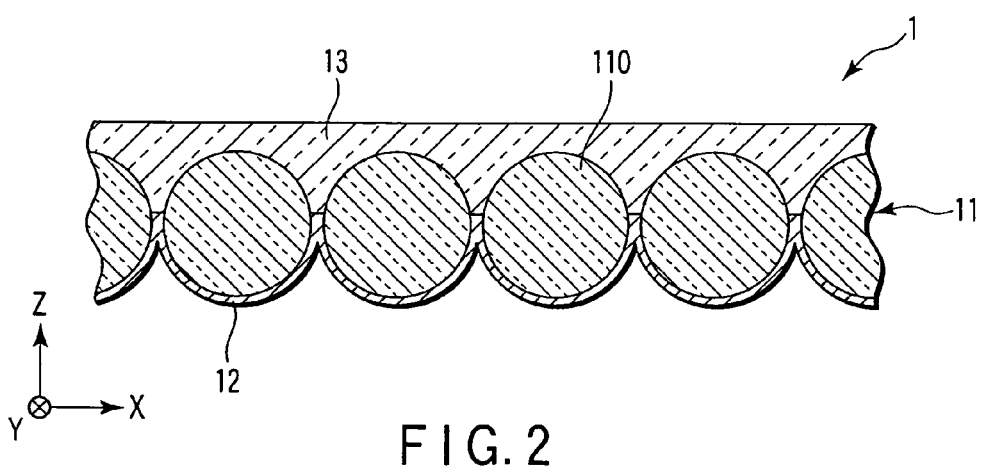
FIG. 2 is a sectional view taken along the line II-II of the optical device shown in FIG. 1.

FIG. 1 is a plan view schematically showing an optical device according to an embodiment of the present invention. FIG. 2 is a sectional view taken along the line II-II of the optical device shown in FIG. 1.

The optical device 1 includes a particulate layer 11, a reflecting layer 12 and a carrier layer 13. The optical device 1 has a front surface on the side of the carrier layer 13 and a back surface on the side of the reflecting layer 12.

The particulate layer 11 is made of transparent particles 110 arranged two-dimensionally. Specifically, the transparent particles 110 are arranged in X direction and Y direction which are parallel with a display surface of the optical device 1 and cross each other. Here, X direction and Y direction form an angle of about 60°.

The transparent particles 110 are not stacked in layers in Z direction which is perpendicular to X direction and Y direction. That is, the particulate layer 11 is a monolayer of the transparent particles 110.

The transparent particles 110 are arranged regularly. Typically, the transparent particles 110 form an array structure which includes irregularities and/or defects. Here, for the sake of simplifying an explanation, it is supposed that the transparent particles 110 are arranged regularly. Specifically, it is supposed that the transparent particles 110 form a triangle lattice.

An average particle diameter of the transparent particles 110 is, for example, 2.5 μm or less. The average particle diameter may fall within a range of 200 nm to 800 nm, or a range of 200 nm to 500 nm, or a range of 200 nm to 400 nm.

A particle-size distribution, here a number distribution, of the transparent particles 110 satisfies the following conditions, for example. That is, 70% or more of the particles has a particle diameter 0.8 times the average particle diameter or more and 1.2 times the average particle diameter or less. Typically, 90% or more of the particles has a particle diameter 0.9 times the average particle diameter or more and 1.1 times the average particle diameter or less.

The transparent particles 110 may be in contact with each other or be spaced apart from each other.

A proportion of the transparent particles 110 in a unit area, namely, a filling factor is, for example, 30% or more, and typically 60% or more.

An average center-to-center distance of the transparent particles 110 is equal to or longer than the average particle diameter of the transparent particles 110. The average center-to-center distance of the transparent particles 110 is, for example, 2.5 μm or less. The average center-to-center distance may fall within a range of 200 nm to 800 nm, or a range of 200 nm to 500 nm, or a range of 200 nm to 400 nm.

An average ratio of the maximum diameter with respect to the minimum diameter of the transparent particles 110 falls, for example, within a range of 1.0 to 1.2. Typically, the transparent particles 110 have roughly spherical shapes. The transparent particles 110 may have other shapes. For example, the transparent particles 110 may have roughly spheroidal shapes.

Here, almost all the numerical values for the transparent particles 110 are values obtained utilizing a scanning electron microscope (SEM) and/or a transmission electron microscope (TEM). Specifically, three fields of view are chosen on the particulate layer 110 at random, and then a microphotograph is taken for each field of view. The size of each field of view are determined such that a sufficient numbers of the transparent particles 110 are present therein and size of each transparent particle 110 can be measured accurately. For example, the size of each field of view is set at 100 μm² or more. Using these microphotographs, the numerical values for the transparent particles 110 are obtained. Note that the average particle diameter and the particle-size distribution of the transparent particles 110 are an average and a number distribution of the maximum diameters obtained for all the transparent particles 110 within each field of view, respectively. Note also that the filling factor is a numerical value obtained when each transparent particle 110 is supposed to be a sphere having the same diameter as the above-described average particle diameter.

The transparent particles 110 are made of a colorless or colored transparent material. Typically, the transparent particles 110 are made of a colorless transparent material. The transparent particles 110 are made of, for example, an organic or inorganic material.

As the organic material, for example, acrylic resin, polyester, polyimide, polyolefin, polymethyl acrylate, polymethyl methacrylate, polyethylene, polypropylene, polyether sulfone, polyamide, nylon, polyurethane, polyvinyl chloride, polyvinylidene chloride, acrylamide, or a copolymer including one or more of them can be used.

As the inorganic material, for example, calcium carbonate, barium carbonate, magnesium carbonate, calcium silicate, barium silicate, magnesium silicate, calcium phosphate, barium phosphate, magnesium phosphate, silicon oxide, titanium oxide, iron oxide, cobalt oxide, zinc oxide, nickel oxide, manganese oxide, aluminum oxide, iron hydroxide, nickel hydroxide, aluminum hydroxide, calcium hydroxide, chrome hydroxide, zinc hydroxide, aluminum silicate, zinc carbonate, basic copper carbonate, zinc sulfide or glass can be used.

Each transparent particle 110 may have a homogeneous composition or an inhomogeneous composition. In the latter case, the transparent particle 110 may include, for example, a core portion and a shell portion covering the entire surface of the core portion and having a refractive index different from that of the core portion. Alternatively, the transparent particle 110 may include a plurality of layers having different refractive indices and stacked alternately. Alternatively, the transparent particle 110 may be subjected to a surface treatment.

The transparent particle 110 may be solid, hollow or porous. The porous transparent particle 110 may be an aggregate of fine particles or not.

The reflecting layer 12 covers the back surface of the particulate layer 11. The interface between the reflecting layer 12 and the particulate layer 11 has a light-reflecting property.

The reflecting layer 12 may have a light-transmitting property or a light-shielding property. For example, in the case where it offers a transmittance of 20% or more over the whole visible range, for example, the wavelength range of 400 nm to 700 nm, an image behind the optical device 1 can be observed therethrough.

The interface between the reflecting layer 12 and the particulate layer 11 is provided with a first relief structure which includes first recesses or protrusions corresponding to the transparent particles. The first relief structure emits a first diffracted light when illuminated with a light. The light is typically a visible light. Note that the sizes of the first recesses or protrusions are the same as that of the transparent particles 110.

As the material of the reflecting layer 12, for example, a metal or alloy, a transparent dielectric material, or a combination thereof can be used.

The transparent dielectric material is different from the transparent particles, for example, in refractive index. For example, an absolute value of the difference between the refractive index of the transparent dielectric material and the refractive index of the transparent particles 110 is 0.2 or more. When this difference is great, a high reflectance can be achieved.

As the transparent dielectric material, ceramics or a polymeric organic substance can be used. As the ceramics, for example, antimony oxide ($Sb_2O_3$: 3.0), ferric oxide ($Fe_2O_3$: 2.7), titanium oxide ($TiO_2$: 2.6), cadmium sulfide (CdS: 2.6), cerium oxide ($CeO_2$: 2.3), zinc sulfide (ZnS: 2.3), lead chloride ($PbCl_2$: 2.3), cadmium oxide (CdO: 2.2), antimony oxide ($Sb_2O_3$: 5), tungsten oxide ($WO_3$: 5), silicon monoxide (SiO: 5), silicon dioxide ($SiO_2$: 1.45), silicon trioxide ($Si_2O_3$: 2.5), indium oxide ($In_2O_3$: 2.0), lead oxide (PbO: 2.6), tantalum oxide ($Ta_2O_3$: 2.4), zinc oxide (ZnO: 2.1), zirconium oxide ($ZrO_2$: 5), magnesium oxide (MgO: 1), dimeric silicon monoxide ($Si_2O_2$: 10), magnesium fluoride ($MgF_2$: 4), cerium fluoride ($CeF_3$: 1), calcium fluoride ($CaF_2$: 1.3-1.4), aluminum fluoride ($AlF_3$: 1), aluminum oxide ($Al_2O_3$: 1) or gallium oxide (GaO: 2) can be used. As the polymeric organic substance, for example, polyethylene (1.51), polypropylene (1.49), polytetrafluoroethylene (1.35), polymethyl methacrylate (1.49) or polystyrene (1.60) can be used. Note that the numerical values within the parentheses represent refractive indices.

Alternatively, as the material of the reflecting layer 12, a mixture of particles made of metal, alloy, ceramics or polymeric organic substance and a transparent resin may be used. In this case, the reflecting layer 12 may also serve as a sticky layer or an adhesive layer.

The reflecting layer 12 may have a monolayer structure or a multilayer structure. In the latter case, the reflecting layer 12 may be, for example, a multilayer designed to cause multi-beam interference.

The reflecting layer 12 may cover the entire back surface of the particulate layer 11. Alternatively, the reflecting layer 12 may cover only a part of the back surface of the particulate layer 11. That is, the reflecting layer 12 may be patterned. In this case, the reflecting layer 12 may be patterned in order to define a contour of an image to be displayed on the optical device 1. Alternatively, the reflecting layer 12 may be patterned in dots or mesh form in order to achieve the optimum reflectance.

The carrier layer 13 covers the front surface of the particulate layer 11. The carrier layer 13 supports the transparent particles 110. Less than half the volume of each transparent particle 110 is embedded in the carrier layer. The carrier layer 13 may be omitted.

The interface between the carrier layer 13 and the particulate layer 11 has a light-transmitting property. This interface has a reflectance smaller than that of the light-reflecting interface between the reflecting layer 12 and the particulate layer 12. For example, the light-transmitting interface has a smaller reflectance for the light diffracted by the first relief structure as compared with the light-reflecting interface.

Typically, the light-transmitting interface has a transmittance greater than that of the light-reflecting interface between the reflecting layer 12 and the particulate layer 11. For example, the light-transmitting interface has a smaller transmittance for the light diffracted by the first relief structure as compared with the light-reflecting interface.

The interface between the carrier layer 13 and the particulate layer 11 is provided with a second relief structure which includes second recesses or protrusions corresponding to the transparent particles 110. The second relief structure emits a second diffracted light when irradiated with a light. This light is typically a visible light. Note that the sizes of the second recesses or protrusions are the same as that of the transparent particles 110.

The carrier layer 13 is made of a colorless or colored transparent material. Typically, the carrier layer 13 is colorless and transparent. As the material of the carrier layer 13, for example, a transparent resin can be used.

In the case where a volumetric ratio of the carrier layer 13 is sufficiently small with respect to a volumetric ratio of the particulate layer 11, for example, in the case where an average thickness of the carrier layer 13 is less than 50% of the average diameter of the transparent particles 110, there is a probability that the carrier layer 13 is localized in the void between the transparent particles 110 or at a point of contact between the transparent particles 110. Alternatively, there is a probability that the front surface of the carrier layer 13 has a shape corresponding to the surface shape of the particulate layer 11. In such cases, the refractive index of the carrier layer 13 may be different from or equal to the refractive index of the transparent particles 110.

In the case where the front surface of the carrier layer 13 is flat, the carrier layer 13 has a refractive index different from that of the transparent particles 110. An absolute value of the difference between the refractive indices falls, for example, within a range of 0.1 to 1.5.

When the optical device 1 is irradiated with light from the front, each of the first and second relief structures emits a diffracted light. The diffracted light emitted by the first relief structure and the diffracted light emitted by the second relief structure can cause constructive interference or destructive interference. Further, each of the first and second relief structures scatters part of incident light.

That is, each of the first and second relief structures emits a diffracted light and a scattered light. In addition, when the observation conditions are changed, the wavelength of the diffracted light is changed, and the intensity ratio of the diffracted light with respect to the scattered light is also changed.

An optical device 1 from which the particulate layer 11 and the carrier layer 13 are omitted does not emit a scattered light at high intensity. On the other hand, an optical device 1 from which the reflecting layer 12 is omitted does not emit a diffracted light at high intensity and does not emit a scattered light at high intensity. That is, when the structure described with reference to FIGS. 1 and 2 is employed, a special visual effect can be achieved.

In the optical device 1, the average center-to-center distance of the transparent particles 110 may be set sufficiently small. For example, the center-to-center distance may be set at 500 nm or less, or 400 nm or less. By doing so, it is possible to allow a diffracted light to be observed with high visibility only in a special situation as will be described below.

As described above, each of the first and second relief structures serves as a diffraction grating. When a diffraction grating is illuminated with a light, the diffraction grating emits a diffracted light at high intensity in a direction specific to a propagation direction of the illumination light as incident light.

In the case where a light propagates in a plane perpendicular to grating lines of a diffraction grating, an angle of emergence $\beta$ of mth-order diffracted light (m=0, ±1, ±2, ...) can be calculated using the following equation (1).

$$d = m\lambda/(\sin\alpha - \sin\beta) \qquad (1)$$

In this formula (I), d represents a grating constant, m represents an order of diffraction, and $\lambda$ represents a wavelength of the incident light and the diffracted light. Further, a represents the angle of emergence of the 1-order diffracted light, i.e., the transmitted light or the regular reflected light. In other words, an absolute value of $\alpha$ is equal to the incident angle of the illumination light, and in the case of a reflection-type diffraction grating, an incident direction of the illumination light and an emergence direction of the regular reflected light are symmetrical to each other with respect to a normal of the interface on which the diffraction grating is provided.

Note that in the case where the diffraction grating is of the reflection-type, the angle $\alpha$ is equal to or greater than 0° and less than 90°. Note also that in the case of obliquely irradiating the interface having the diffraction grating thereon with an illumination light and considering two angular ranges bordering with each other at an angle of the normal direction, i.e., 0°, the angle $\beta$ has a positive value when the emergence direction of the diffracted light and the emergence direction of the regular reflected light are within the same angular range. On the other hand, the angle $\beta$ has a negative value when the emergence direction of the diffracted light and the incident direction of the illumination light are within the same angular range. Hereinafter, the angular range which includes the emergence direction of the regular reflected light is referred to as "positive angular range", while the angular range which includes the incident direction of the illumination light is referred to as "negative angular range".

In the case where the diffraction grating is observed in a normal direction thereof, the diffracted light having an angle of emergence of 0° is the only diffracted light that contributes to the display. Therefore, in this case, if the grating constant d is greater than the wavelength λ, there exist a wavelength λ and an incident angle α that satisfy the above equation (1). That is, in this case, an observer can observe a diffracted light having a wavelength λ which satisfies the above equation (1).

By contrast, in the case where the grating constant d is smaller than the wavelength λ, there is no incident angle α that satisfies the above equation (1). Therefore, in this case, the observer cannot observe a diffracted light.

As will be apparent from the above description, in the case where the average center-to-center distance of the transparent particles 110 is set sufficiently small, each of the first and second relief structures do not emit a diffracted light in the normal direction, or alternatively, a diffracted light emitted by each of the first and second relief structures in the normal direction is the one whose visibility is low.

In the case where the average center-to-center distance of the transparent particles 110 is set sufficiently small, an optical property which is different from that of a normal diffraction grating in the following respects can be further obtained.

Figure 3:
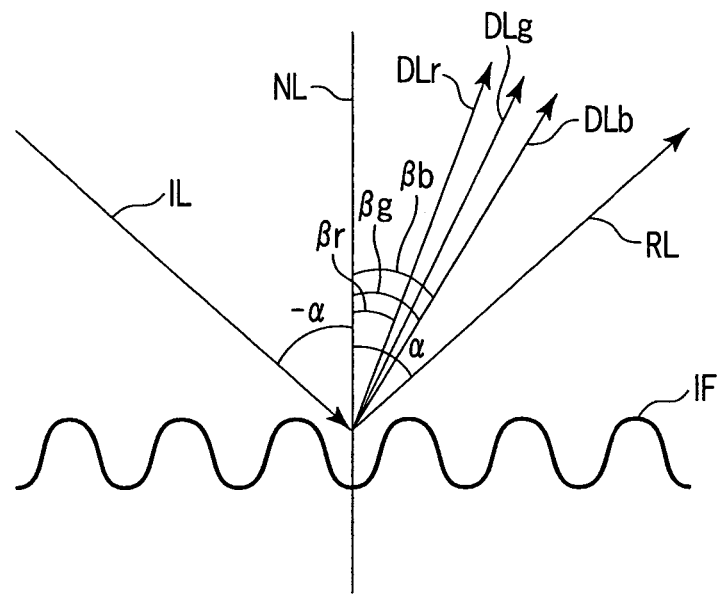
FIG. 3 is a view schematically showing a manner in which a diffraction grating emits a first-order diffracted light.
Figure 4:
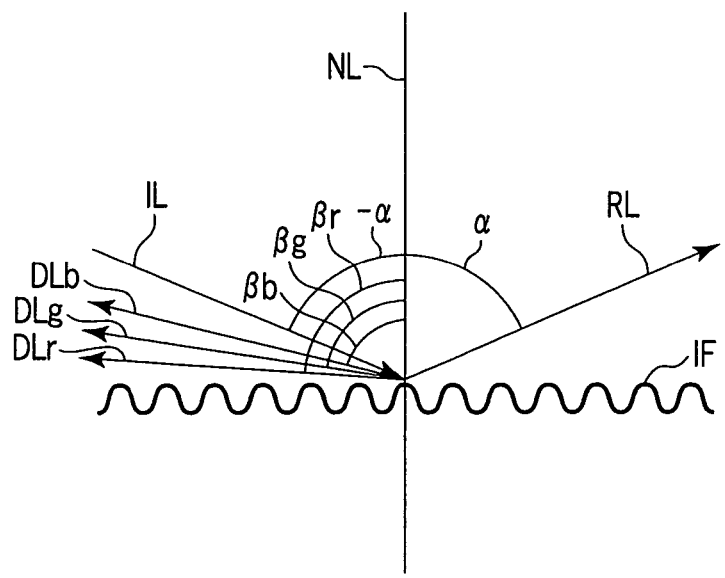
FIG. 4 is a view schematically showing a manner in which another diffraction grating emits a first-order diffracted light.

FIG. 3 is a view schematically showing a manner in which a diffraction grating emits a first-order diffracted light. FIG. 4 is a view schematically showing a manner in which another diffraction grating emits a first-order diffracted light.

In FIGS. 3 and 4, IF represents an interface on which a diffraction grating is formed, and NL represents a normal of the interface IF. Further, IL represent a white illumination light composed of a plurality of rays having different wavelengths, RL represents a regular reflected light or 0-order diffracted light, and DLr, DLg and DLb represent red, green and blue-colored first-order diffracted lights as the results of the separation of the white illumination light IL, respectively.

In FIG. 3, the interface IF is provided with a diffraction grating which has a grating constant greater than the minimum wavelength of the visible range, for example, greater than about 400 nm. On the other hand, in FIG. 4, the interface IF is provided with a diffraction grating which has a grating constant smaller than the minimum wavelength of the visible range.

As will be apparent from the above equation (1), in the case where the grating constant d of the diffraction grating is greater than the minimum wavelength of the visible range, when the interface IF is obliquely irradiated with the illumination light IL as shown in FIG. 3, the diffraction grating emits the first-order diffracted lights DLr, DLg and DLb at emergence angles βr, βg and βb within the positive angular range. Although not shown in the figure, the diffraction grating also emits first-order diffracted lights of other wavelengths at this time.

By contrast, in the case where the grating constant d of the diffraction grating is greater than half the minimum wavelength of the visible range and smaller than the minimum wavelength, the diffraction grating emits the first-order diffracted lights DLr, DLg and DLb at emergence angles βr, βg and βb within the negative angular range.

As will be apparent from the above description, when the average center-to-center distance of the transparent particles 110 is made sufficiently small, each of the first and second relief structures does not emit a diffracted light within the positive angular range but emits a diffracted light only within the negative angular range. Alternatively, each of the first and second relief structures emits a diffracted light within the positive angular range with low visibility and emits a diffracted light within the negative angular range with high visibility. That is, different from a normal diffraction grating, each of the first and second relief structures emits a diffracted light with high visibility only within the negative angular range.

Further, in the optical device 1, the transparent particles 110 form recesses or protrusions having tapered shapes on each of the light-reflecting interface and the light-transmitting interface. In the case of employing such a structure, if the center-to-center distance is sufficiently small, each of the interfaces and a region in the vicinity thereof can be considered to have a refractive index continuously changing in Z direction. Thus, the reflectances of the light-reflecting interface and light-transmitting interface are small regardless of the angle of observation. Further, as described above, the first and second relief structures emit substantially no diffracted light in the normal direction. In addition, the transparent particles 110 scatter part of the incident light.

That is, in the case where the center-to-center distance is sufficiently small, the optical device 1 emits almost no regular reflected light. Further in this case, the optical device 1 emits a diffracted light with high visibility only within the negative range. In addition, the optical device 1 emits the scattered light over a wide angular range.

Therefore, the optical device 1 displays a dark muddy color when observed from the front. The optical device 1 also displays a dark muddy color when illuminated in a direction within the negative angular range and observed in a direction within the positive angular range. In addition, the optical device 1 displays a spectral color when illuminated in a direction within the negative and observed in a direction within the negative angular range.

As above, setting the center-to-center distance sufficiently small allows a diffracted light with high visibility to be observed only under a special condition. In addition, the optical device 1 displays a dark muddy color under other conditions. Thus, in the case where the optical device 1 is a genuine article, an optical device whose genuineness is unknown can be discriminated between a genuine article and a non-genuine article by checking the above optical characteristics.

Although described herein is the behavior of the light within the visible range, the same phenomenon occurs to the light within the infrared region. That is, when the center-to-center distance is set appropriately, it is possible to prevent the optical device 1 from emitting a diffracted light within the positive angular range for any wavelength within a specific wavelength range, for example, within a wavelength range of 1,000 nm to 1,200 nm. Further, in this case, it is possible to allow the optical device 1 to emit a diffracted light having a wavelength within the above specific wavelength range in a direction within the negative angular range. Therefore, it is possible to discriminate an optical device whose genuineness is unknown between a genuine article and a non-genuine article using infrared light.

The optical device 1 achieves superior forgery prevention effects in the other respects.

As described above, the transparent particles 110 typically form an array structure which includes irregularities and/or defects. The same irregularities and/or defects cannot be reproduced using the manufacturing method described later.

Further, the array structure including irregularities and/or defects is unique to each optical device 1. Therefore, when the array structure is recorded in advance, an optical device whose genuineness is unknown can be discriminated between a genuine article and a non-genuine article by comparing an array structure included in the particular optical device with the recorded array structure.

Furthermore, in each relief structure formed by the transparent particles 110, a ratio of height of the protrusions with respect to the center-to-center distance of the protrusions is great. In addition, the transparent particle 110 typically has a shape which includes a combination of a forward tapered shape and a reverse tapered shape. It is very difficult to replicate such a structure by a transfer from the optical device 1. Even if such a replication is possible, the same visual effect as that of the optical device 1 cannot be achieved unless the same materials as those of the constituents of the optical device 1 are used.

As above, when the optical device 1 is used, discrimination between a genuine and a forgery can be performed using a plurality of methods. In addition, the optical device 1 is very difficult to forge. Thus, according to this technique, superior forgery prevention effects can be achieved.

The optical device 1 can be manufactured, for example, by the following method.

First, the carrier layer 13 is formed on a substrate (not shown). As the substrate, for example, a film with a smooth surface can be used. The carrier layer 13 is formed, for example, by a printing method such as gravure printing, micro-gravure printing, reverse gravure printing, roll coating, bar-coat printing, flexographic printing, screen printing, spin-coat printing, spray-coat printing and ink-jet printing. The carrier layer 13 is formed to have a thickness which is, for example, smaller than the average particle diameter of the transparent particles 110, for example, a thickness falling within a range of 0.001% to 80% of the average particle diameter of the transparent particles 110, and typically a thickness of about 25% of the average particle diameter of the transparent particles 110.

In the case where the carrier layer 13 is formed using a printing method, as the coating solution, for example, a liquid resin or a composition containing a resin and a solvent can be used. As the resin, for example, sticky resin, hot-tack resin, thermoplastic resin, thermosetting resin, ultraviolet-curing resin or ionizing radiation-curing resin can be used. As the solvent, for example, water or a nonaqueous solvent can be used.

The coating solution may further contain a crosslinker. Alternatively, the resin contained in the coating solution may include a crosslinkable reaction group. As the crosslinkable reaction group, for example, isocyanate group, epoxy group, carbodiimide group, oxazoline group or silanol group can be used. For example, when the surfaces of the transparent particles 110 are modified with the crosslinkable reaction group, it is possible to cause a crosslinking reaction between the transparent particles 110 or to cause a crosslinking reaction between the resin and the transparent particles 110. Not that when causing the crosslinking reaction, the coating solution may further contains a catalyst which promotes the reaction.

Instead of using the printing method for forming the carrier layer 13, a film or sheet-like carrier layer 13, which can be handled alone, may be used. As the material of such a carrier layer 13, for example, the above-described resin can be used.

Next, the particulate layer 11 is formed on the carrier layer 13.

For example, the transparent particles 110 are dispersed on the carrier layer 13, and then the transparent particles 110 are fixed onto the carrier layer 13. In the case where the carrier layer 13 is sticky, the transparent particles 110 are fixed on the carrier layer 13 when they are in contact with the carrier layer 13. In the case where the carrier layer 13 is made of a hot-tack resin or thermoplastic resin, the transparent particles 110 can be fixed on the carrier layer 13, for example, by heating the carrier layer 13 when dispersing the transparent particles 110 and cooling it thereafter. In the case where the carrier layer 13 is made of a thermosetting resin, the transparent particles 110 can be fixed on the carrier layer 13 by heating the carrier layer 13 after dispersing the transparent particles 110. In the case where the carrier layer 13 is made of an ultraviolet-curing resin or ionizing radiation-curing resin, the transparent particles 110 can be fixed on the carrier layer 13 by exposing the carrier layer 13 to an ultraviolet radiation or ionization radiation after dispersing the transparent particles 110. Note that the transparent particles 110 can be fixed on the carrier layer 13 also by removing the solvent after dispersing the transparent particles 110.

After fixing, excess transparent particles 110 are removed. For removing, for example, suction, blowing or washing using liquid is utilized. Thus, the particulate layer 11 is obtained.

Then, the reflecting layer 12 is formed on the particulate layer 11.

The reflecting layer 12, which is made of metal, alloy or ceramics, is formed, for example, by vapor deposition such as vacuum evaporation, sputtering and chemical vapor deposition. When using the vapor deposition, the reflecting layer 12 can be formed as a continuous film. Also, in a film-forming process using vapor deposition, in particular, physical vapor deposition, a deposition material such as metal or alloy is initially deposited in an island or mesh-pattern, and then forms a continuous film. Therefore, when utilizing this, an island or mesh-like reflecting layer 12 can be obtained. The island or mesh-like reflecting layer 12 has a transmittance higher than that of a reflecting layer as a continuous film.

The reflecting layer 12 may be formed using oblique evaporation or oblique sputtering. When using oblique evaporation or oblique sputtering, the reflecting layer 12 can be obtained to have an anisotropic reflecting property. In this case, a more complicated visual effect can be achieved as compared with the case where the reflecting layer 12 is formed to have an isotropic reflecting property.

The reflecting layer 12 made of a polymeric organic substance or the above mixture is formed, for example, using a printing method such as gravure printing, flexographic printing and screen printing. In this case, the thickness of the reflecting layer 12 is set, for example, within a range of 0.001 μm to 10 μm.

Thereafter, the reflecting layer 12 is patterned as needed. Thus, the optical device 1 is obtained.

According to this method, a microstructure can be formed without using heat-embossing or photolithography. Thus, according to this method, a high productivity can be achieved.

Various modifications can be made to this manufacturing method.

For example, the carrier layer 13 and the particulate layer 11 may be formed simultaneously. That is, the transparent particles 110 are contained in the coating solution used for forming the carrier layer 13. Then, the coating solution is applied to the substrate, and subsequently the coated film is hardened. Thereafter, excess transparent particles 110 are removed. If the carrier layer 13 is sufficiently thin, the particulate layer 11 can be obtained as a monolayer of the transparent particles 110. Thus, the carrier layer 13 and the particulate layer 11 are formed simultaneously. Then, the reflecting layer 12 is formed on the particulate layer 11. As above, the optical device 1 is obtained.

The optical device thus obtained is different from the optical device 1 shown in FIG. 2 in the following respects. This will be described with reference to FIG. 5.

Figure 5:
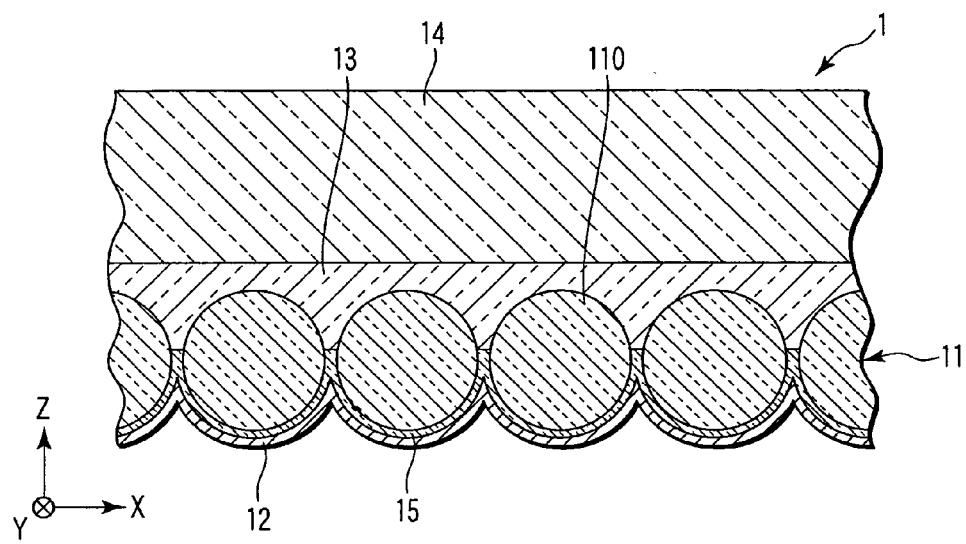
FIG. 5 is a sectional view schematically showing a modified example of the optical device shown in FIGS. 1 and 2.

FIG. 5 is a sectional view schematically showing a modified example of the optical device shown in FIGS. 1 and 2.

The optical device 1 shown in FIG. 5 further includes a substrate 14 and a transparent cover layer 15.

The substrate 14 faces the particulate layer 11 with the carrier layer 13 interposed therebetween. The substrate 14 can be omitted.

The transparent cover layer 15 is interposed between the particulate layer 11 and the reflecting layer 12. The transparent cover layer 15 is made of the same material as that of the carrier layer 13.

When the back surface of the particulate layer 11 is covered with the transparent cover layer 15 as above, the transparent particles 110 are less prone to fall off.

The optical device 1 shown in FIG. 5 can be formed by other methods. For example, the carrier layer 13 and the particulate layer 11 are formed on the substrate 14 in this order, and subsequently the transparent cover layer 15 is formed on the particulate layer 11. Then, the reflecting layer 12 is formed on the transparent cover layer 15 so as to obtain the optical device 1 shown in FIG. 5. Note that in the case of employing this method, the material of the transparent cover layer 15 may be the same as or different from the material of the carrier layer 13.

Other modifications can be made to this optical device 1.

Figure 6:
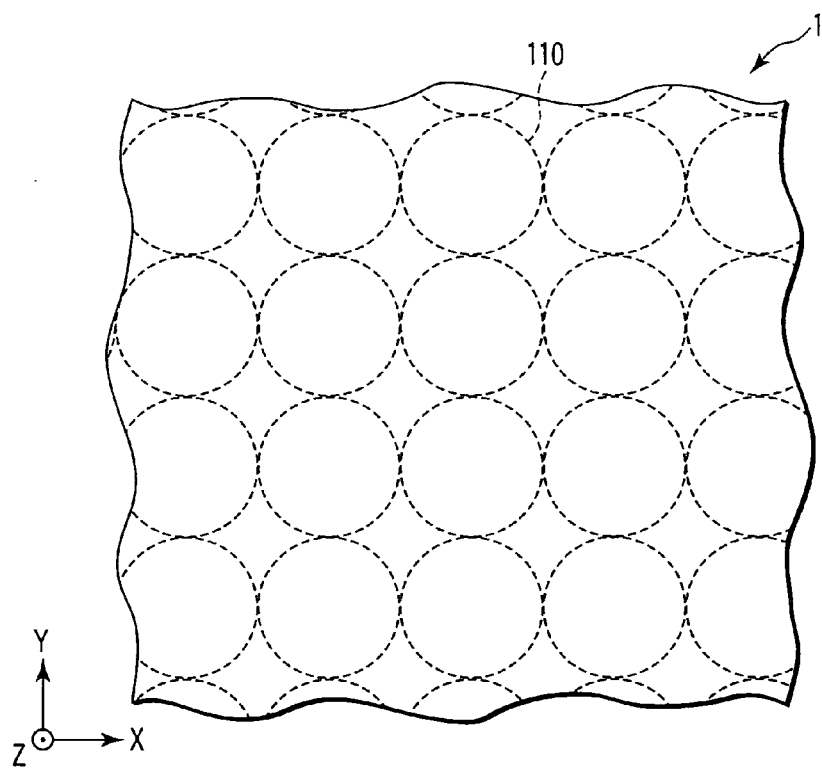
FIG. 6 is a sectional view schematically showing another modified example of the optical device shown in FIGS. 1 and 2.

FIG. 6 is a sectional view schematically showing another modified example of the optical device shown in FIGS. 1 and 2.

The optical device 1 shown in FIG. 6 is the same as the optical device 1 described with reference to FIGS. 1 and 2 except that the transparent particles 110 form a square lattice. As above, the transparent particles 110 may form a lattice other than the triangular lattice.

Figure 7:
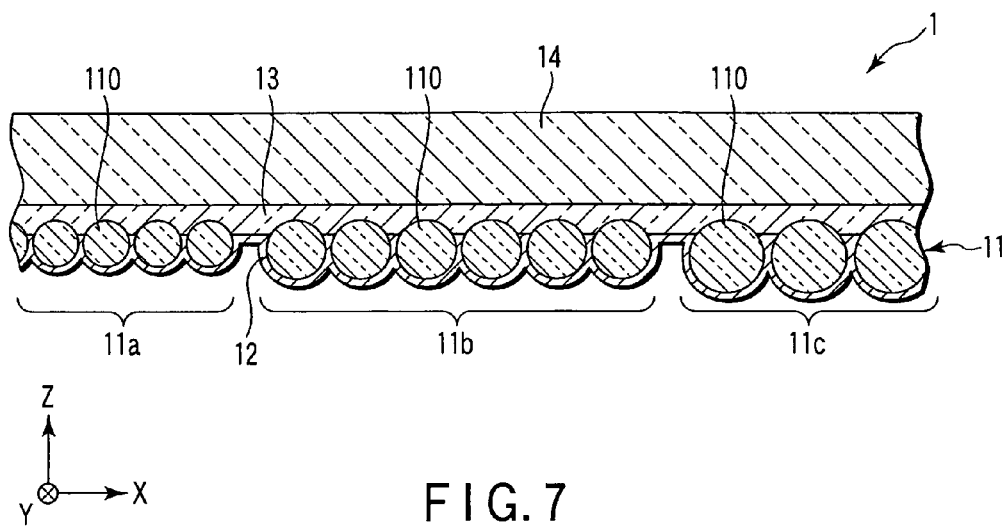
FIG. 7 is a sectional view schematically showing still another modified example of the optical device shown in FIGS. 1 and 2.

FIG. 7 is a sectional view schematically showing still another modified example of the optical device shown in FIGS. 1 and 2.

The optical device 1 shown in FIG. 7 is the same as the optical device 1 described with reference to FIGS. 1 and 2 except that the following structure is employed. That is, this optical device 1 further includes the substrate 14. In addition, the particulate layer 11 includes regions 11a to 11c.

The regions 11a to 11c are different from one another in the particle diameters of the transparent particles 110. Thus, the regions 11a to 11c are different from one another in the center-to-center distances of the transparent particles 110. Therefore, the portions of the optical device 1 corresponding to the regions 11a to 11c do not emit diffracted lights in the same direction or alternatively emits diffracted lights having different wavelengths in the same direction.

In the case of employing such a structure, a multicolored image can be displayed on the optical device 1. That is, a more complicated image can be displayed on the optical device 1.

Figure 8:
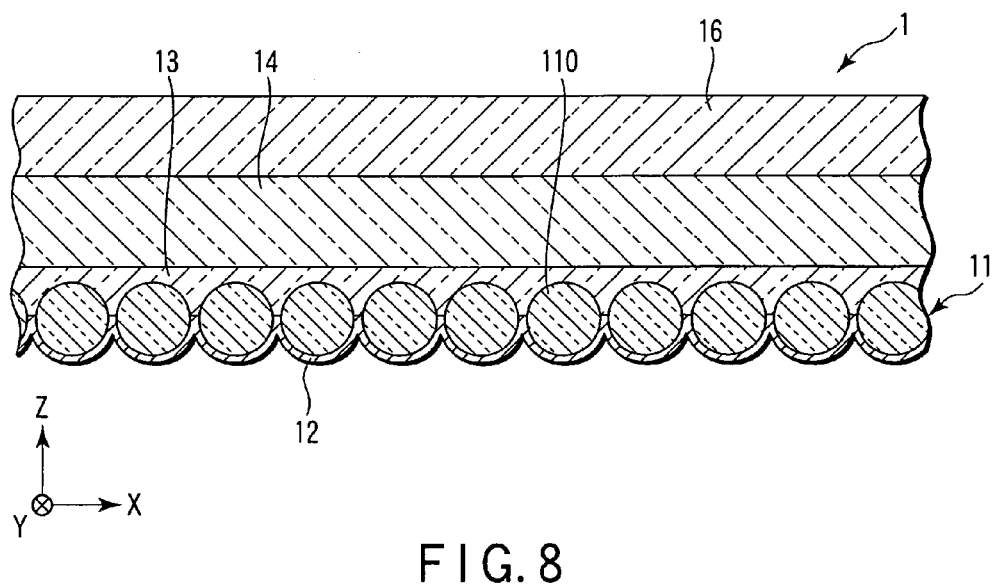
FIG. 8 is a sectional view schematically showing still another modified example of the optical device shown in FIGS. 1 and 2.

FIG. 8 is a sectional view schematically showing still another modified example of the optical device shown in FIGS. 1 and 2.

The optical device 1 shown in FIG. 8 is the same as the optical device 1 described with reference to FIGS. 1 and 2 except that the following structure is employed. That is, this optical device 1 further includes the substrate 14 and a polarizer 16.

The polarizer 16 faces the particulate layer 11 with the substrate 16 and the carrier layer 13 interposed therebetween. The polarizer 16 is, for example, a linear polarizer.

As the polarizer 16, for example, a polarizing film prepared by drawing a resin film added with a dichromatic dye can be used.

Alternatively, as the polarizer 16, the polarizing layer obtained by the following method may be used. First, a coated film made of polyimide, polyamide or polyvinyl alcohol is formed using spin coating and then dried. Next, the coated film is subjected to rubbing process or photo-alignment process to obtain an alignment layer. Thereafter, a dichromatic dye or a composition containing a dichromatic dye and a nematic liquid crystal material is applied to the alignment layer, and then the coated film is dried. The polarizing layer thus obtained may be used as the polarizer 16.

The polarizer 16 may be adhered on the substrate 16. Alternatively, the polarizer 16 may be formed on the substrate 16.

When the structure shown in FIG. 8 is employed, the visual effect described below can be obtained. Note that for the sake of simplification, it is supposed here that the transparent particles 110 form the square lattice shown in FIG. 6, and one of the array directions thereof is parallel with X direction. Further, it is supposed that the polarizer 16 is a linear polarizer having a transmission axis parallel with X direction.

In the case where a grating constant d of a diffraction grating, and a wavelength $\lambda$ and an incidence angle $\theta$ of an incident light satisfy the relationship represented by the following inequality (2), the diffraction structure behaves on an s-polarized light as if it is a thin film having an effective refractive index $N_{TM}$.

$$d \times \cos\theta < \lambda \quad (2)$$

Note that an s-polarized light is a linearly polarized light in which a vibration direction of the electric field vector is perpendicular to the propagation directions of the illumination light and the diffracted light, i.e., TE wave (transverse electric wave). On the other hand, a p-polarized light is a linearly polarized light which has a vibration direction of the electric field vector different from that of the s-polarized light by 90°, i.e., TM wave (transverse magnetic wave).

Except for the case where the depth of the groove of the diffraction grating differs from the grating constant d, an effective refractive index $N_{TE}$ and an effective refractive index $N_{TT}$ are different from each other. In the case where the incident angle $\theta$ satisfies the relationship represented by the following inequality (3) or (4), an s-polarized light enters the above-described thin film, while a p-polarized light cannot enter the thin film but is reflected by this thin film. Note that in the following inequalities (3) and (4), $N_1$ is a refractive index of a medium located in front of the above-described thin film.

$$N_{TN}/N_1 < \sin\theta < N_{TE}/N_1 \quad (3)$$

$$N_{TE}/N_1 < \sin\theta < N_{TM}/N_1 \quad (4)$$

As will be apparent from the above, in the case where the incident angle $\theta$ satisfies the relationship represented by the inequality (3) or (4), the diffracted lights emitted by the first and second relief structures are s-polarized lights or p-polarized lights. Here, as an example, it is supposed that when the incident angle $\theta$ satisfies the relationship represented by the inequality (3) or (4), the first and second relief structures emit s-polarized lights as the diffracted lights.

As described above, the transmission axis of the polarizer 16 is parallel with X direction. Therefore, in the case where the optical device 1 is illuminated in a direction perpendicular to X direction at an incident angle $\theta$ that satisfies the relationship represented by the inequality (3) or (4), the diffracted lights are transmitted by the polarizer 16. On the other hand, in the case where the optical device 1 is illuminated in a direction perpendicular to Y direction at an incident angle $\theta$ that satisfies the relationship represented by the inequality (3) or (4), the diffracted lights are absorbed by the polarizer 16. Thus, when rotating the optical device 1 around an axis parallel with Z direction while the illumination direction and the observation angle kept unchanged, the optical device 1 displays a bright image and a dark image alternately.

Figure 9:
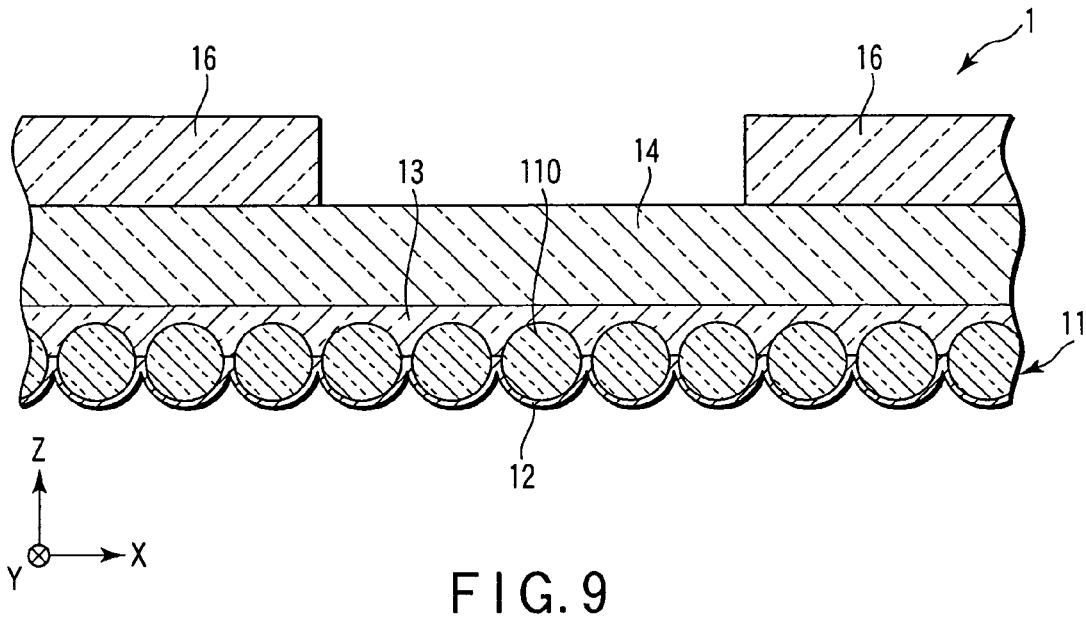
FIG. 9 is a sectional view schematically showing a modified example of the optical device shown in FIG. 8.
Figure 10:
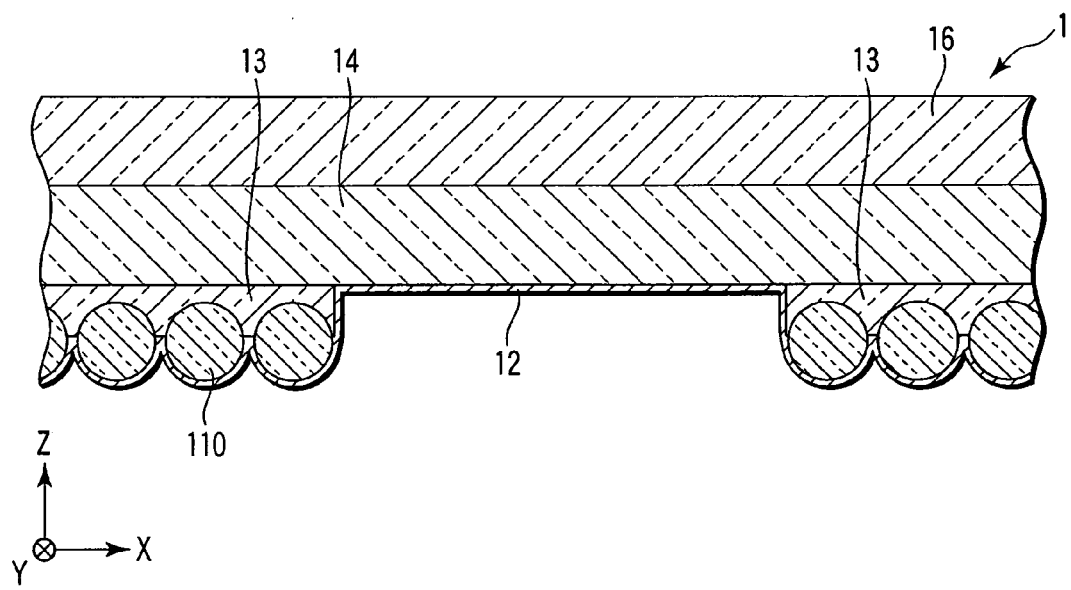
FIG. 10 is a sectional view schematically showing another modified example of the optical device shown in FIG. 8.

In the case of using the polarizer 16, the structure shown in FIG. 9 or 10 may be employed in the optical device 1.

FIG. 9 is a sectional view schematically showing a modified example of the optical device shown in FIG. 8.

The optical device 1 shown in FIG. 9 is the same as the optical device 1 described with reference to FIG. 8 except that the polarizer is patterned.

For example, it is supposed that a first portion of the optical device 1 corresponding to the opening of the polarizer 16 emits an s-polarized light as a diffracted light. In this case, when the vibration direction of the electric field vector of the s-polarized light is parallel with the transmission axis of the polarizer 16, a second portion of the optical device 1 corresponding to the polarizer 16 also emits a diffracted light. By contrast, when the vibration direction of the electric field vector of the s-polarized light is perpendicular to the transmission axis of the polarizer 16, the second portion does not emit a diffracted light.

That is, under a certain observation condition, both the first and second portions can be seen bright. On the other hand, under another observation condition, the first portion can be seen bright, while the second portion can be seen dark.

FIG. 10 is a sectional view schematically showing another modified example of the optical device shown in FIG. 8.

The optical device 1 shown in FIG. 10 is the same as the optical device 1 described with reference to FIG. 8 except that the particulate layer 11 is patterned.

A third portion of the optical device 1 corresponding to the opening of the particulate layer 11 does not emit a diffracted light but emit a regular reflected light. On the other hand, a fourth portion of the optical device 1 corresponding to the particulate layer 1 behaves as the above-described second portion.

The structures shown in FIGS. 9 and 10 can be combined with each other. That is, the optical device 1 may includes two or more of the following portions: a portion in which both the particulate layer 11 and the polarizer 16 are provided, a portion in which either one of the particulate layer 11 and the polarizer 16 is provided, and a portion in which neither the particulate layer 11 nor the polarizer is provided.

The visual effects described with reference to FIGS. 1 and 2 can be obtained when the following structure is employed.

FIG. 11 is a plan view schematically showing an optical device according to another embodiment of the present invention.

The optical device 1 shown in FIG. 11 includes a front layer 13', a back layer 17, a reflecting layer 12 and an interlayer 11'. The optical device 1 has a front surface on the side of the front layer 13' and a back surface on the side of the back layer 17.

The front layer 13' is a colorless or colored transparent layer. Typically, the front layer 13' is colorless and transparent.

The front layer 13' is made of, for example, resin. As the material of the front layer 13', for example, photo-setting resin, thermosetting resin or thermoplastic resin can be used.

The main surface of the front layer 13 that facing the back layer 17 is provided with the above-described first relief structure. The front layer 13' plays almost the same optical role as that of the carrier layer 13. Therefore, the optical properties required for the front layer 13' are almost the same as the optical properties required for the carrier layer 13.

The back layer 17 faces the front layer 13'. The main surface of the back layer 17 that faces the front layer 13' is provided with a third relief structure which is almost the same as the above-described second relief structure. In the case of observing in Z direction, the recesses included in the second relief structure are arranged at the same positions as that of the recesses included in the first relief structure.

The back layer 17 is made of, for example, resin. As the material of the back layer 17, for example, photo-setting resin, thermosetting resin or thermoplastic resin can be used.

The reflecting layer 12 cover the main surface of the back layer 17 that is provided with the relief structure. The surface of the reflecting layer 12 facing the front layer, 13' is provided with the above-described second relief structure.

The interlayer 11' is interposed between the front layer 13' and the reflecting layer 12. The interlayer 11' is a colorless or colored transparent layer. Typically, the interlayer 11' is colorless and transparent.

The interlayer 11' is made of, for example, resin. As the material of the interlayer 11', for example, photo-setting resin, thermosetting resin or thermoplastic resin can be used.

The interface between the interlayer 11' and the front layer 13' corresponds to the above-described light-transmitting interface. On the other hand, the interface between the interlayer 11' and the reflecting layer 12 corresponds to the above-described light-reflecting interface. That is, the interlayer 11' plays almost the same optical role as that of the particulate layer 11. Therefore, the optical properties required for the interlayer 11' are almost the same as the optical properties required for the particulate layer 11.

The optical device 1 can be manufactured, for example, by the following method.

First, a thermoplastic resin or photo-setting resin is applied to a substrate (not shown), and then the resin is cured while pushing a master against the coated film. The master is provided with a relief structure which corresponds to the third relief structure. Thus, the back layer 17 is obtained.

Next, the reflecting layer 12 is formed on the back layer 17 using vapor deposition. The reflecting layer 17 is formed such that it covers the third relief structure.

Thereafter, the front layer 13' is obtained by the same method as that described for the back layer 17.

Then, an adhesive or pressure-sensitive adhesive is applied to the front layer 13' and/or the reflecting layer 12. Subsequently, the front layer 13' and the back layer 17 are bonded together such that the reflecting layer 12 and the adhesive or pressure-sensitive adhesive are interposed therebetween. Thereafter, the adhesive is cured as needed.

Thus, the optical device 1 shown in FIG. 11 is completed.

The optical device 11 shown in FIG. 11 can be manufactured by another method.

First, by the same method as described above, the back layer 17 and the reflecting layer 12 are formed in this order.

Next, a thermoplastic resin or photo-setting resin is applied to the reflecting layer 12, and then the resin is cured while pushing a master against the coated film. The master is provided with a relief structure which corresponds to the first relief structure. Thus, the interlayer 11' is obtained.

Then, the front layer 13' is formed on the interlayer 11'. The front layer 13' is obtained, for example, by applying a resin to the interlayer 11' and then hardening the resin layer.

Thus, the optical device 1 shown in FIG. 11 is completed. Note that in this method, the stacking order may be reversed. That is, the front layer 13', the interlayer 11', the reflecting layer 12 and the back layer 17 may be formed in this order.

The optical device 1 shown in FIG. 11 can be manufactured by still another method.

First, using two masters, formed is an interlayer 11' in which a main surface thereof is provided with the first relief structure, while the other main surface thereof is provide with the second relief structure. For example, a thermoplastic resin or photo-setting resin is applied to one of the masters, and the resin is cured while pressing the other master against the coated film.

Next, the front layer 13' is formed on one of the main surfaces of the interlayer 11', while the reflecting layer and the back layer 17 are formed on the other main surface of the interlayer 11' in this order. The front layer 13' is obtained, for example, by applying a resin to the interlayer 11' and then hardening the resin layer. The reflecting layer 12 is firmed, for example, using vapor deposition. The back layer 17 is obtained, for example, by applying a resin to the reflecting layer 12 and then hardening the resin layer.

Thus, the optical device 1 shown in FIG. 11 is completed.

Various modifications can be made to the optical device 1.

For example, one of the front layer 13' and the back layer 17 may be omitted. Alternatively, both the front layer 13' and the back layer 17 may be omitted.

It is possible that the main surface of the front electrode provided with the first relief structure does not face the reflecting layer 12. That is, the first relief structure may be provided on the front surface of the front layer 13'.

It is also possible that the main surface of the back layer 17 provided with the third relief structure does not face the front layer 13'. That is, the third relief structure may be provided on the back surface of the back layer 17. Note that in this case, the reflecting layer 12 should be formed to cover the back surface of the back layer 17.

In the case where the first relief structure is provided on the front surface of the front layer 13', the interlayer 11' may be omitted. Similarly, in the case where the third relief structure is provided on the back surface of the back layer 17, the interlayer 11' may be omitted.

The structure described with reference to FIGS. 1 to 10 may be employed in this optical device 1. For example, the reflecting layer 12 may be a continuous film or be patterned.

It is possible that when observed in Z direction, the recesses included in the second relief structure do not arranged at the same positions as those of the recesses included in the first relief structure. For example, the bottoms of the recesses included in the second relief structure may face the boundaries between the recesses included in the first relief structure.

The center-to-center distance of the recesses or protrusions included in the first relief structure may be different from the center-to-center distance of the recesses or protrusions included in the second relief structure.

FIG. 12 is a sectional view schematically showing a modified example of the optical device shown in FIG. 11. FIG. 13 is a sectional view schematically showing another modified example of the optical device shown in FIG. 11.

In the optical device 1 shown in FIG. 11, the center-to-center distance of the recesses or protrusions included in the first relief structure is smaller than the center-to-center distance of the recesses or protrusions included in the second relief structure.

By contrast, in the optical device 1 shown in FIG. 12, the center-to-center distance of the recesses or protrusions included in the first relief structure is greater than the center-to-center distance of the recesses or protrusions included in the second relief structure.

When employing the structure shown in FIG. 12 or 13, the first and second relief structures behave as diffraction gratings having different grating constants. In addition, in the case where the structure shown in FIG. 12 or 13 is employed, it is possible to achieve a light-scattering property which is different from that achieved in the case of employing the structure shown in FIG. 11. Thus, when the structure shown in FIG. 12 or 13 is employed, it is possible to achieve visual effects which are different from those achieved in the case of employing the structure shown in FIG. 11.

The optical device 1 described with reference to FIGS. 1 to 13 may further include a printed layer on the front surface or between layers. The printed layer may be a continuous film or be patterned. Note that in the case of disposing the printed layer as a continuous film in front of the light-reflecting interface, a transparent material should be used as the material of the printed layer.

The optical device 1 may further include an overcoat as an uppermost layer. When the overcoat is provided, the uppermost surface of the optical device 1 can be made substantially flat.

In the manufacturing process of the optical device 1, corona discharge treatment, plasma treatment or flame treatment may be performed. When such a treatment is performed, a high interlaminer strength can be achieved.

The optical device 1 may further include a light-absorbing layer disposed at the back of the light-reflecting interface. The light-absorbing layer is, for example, a black layer or a colored layer which reflects a colored light when illuminated with a white light. When the light-absorbing layer is provided, if the reflecting layer 12 ahs a high transmittance or the reflecting layer 12 is patterned, it is possible, for example, to allow the light-absorbing layer to absorb the light transmitted by the reflecting layer 12 or the opening thereof.

The optical device 1 may further include an interface which regularly reflects an incident light at a high reflectance. Alternatively, the optical device 1 may further include a light-scattering structure which scatters an incident light. Alternatively, the optical device 1 may further include both the interface which regularly reflects an incident light at a high reflectance and the light-scattering structure which scatters an incident light.

The optical device 1 described with reference to FIGS. 1 to 13 can be used, for example, for the purpose of forgery prevention. The optical device 1 may be used for other purposes other than forgery prevention. For example, the optical device 1 may be used as a toy, a learning material, an ornament, etc.

The optical device 1 can be utilized in various forms as will be described below.

Figure 14:
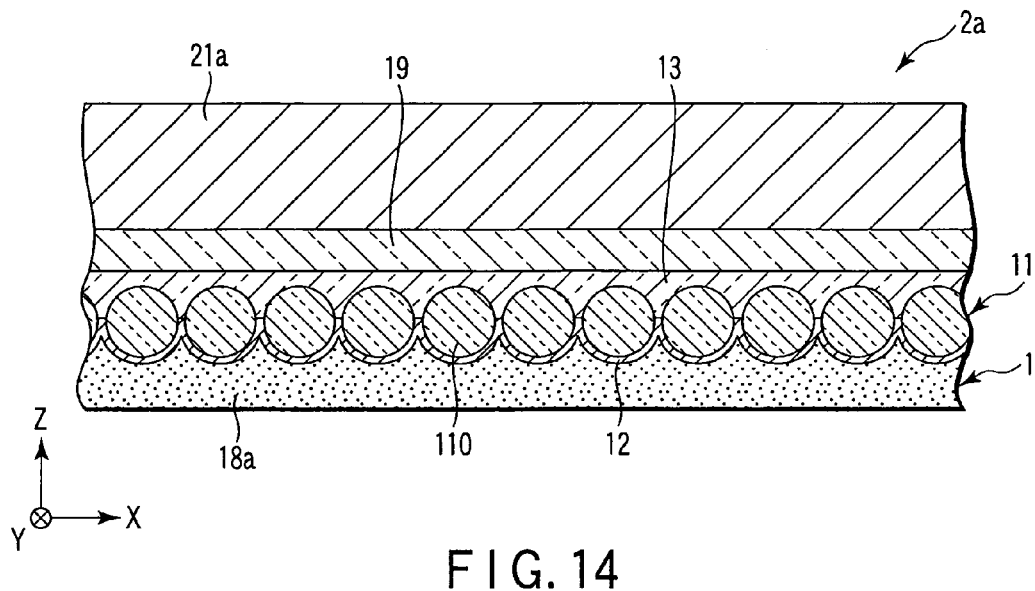
FIG. 14 is a sectional view schematically showing an example of a laminate which includes an optical device.

FIG. 14 is a sectional view schematically showing an example of a laminate which includes an optical device.

The laminate 2a shown in FIG. 14 is a transfer foil. The transfer foil 2a includes an optical device 1 and a support layer 21a.

The optical device 1 is the same as the optical device 1 described with reference to FIGS. 1 and 2 except for employing the following structure.

That is, the optical device 1 further includes an adhesive layer 18a and a protective release layer 19.

The adhesive layer 18a covers the back surface of the reflecting layer. The adhesive layer 18a is made of, for example, thermoplastic resin. For example, in the case where a thermoplastic resin layer is formed on a surface of an article prior to the transfer, the adhesive layer 18a may be omitted.

The protective release layer 19 is interposed between the support layer 21a and the carrier layer 13. The protective release layer 19 is provided in order to promote peeling of the optical device 1 from the support layer 21a. The protective release layer 19 also serves as a protective film which protects the carrier layer 13 from damage.

As the material of the protective release layer 19, for example, a mixture of polymethyl methacrylate resin and another thermoplastic resin such as vinyl chloride-vinyl acetate copolymer or nitrocellulose resin, or a mixture of polymethyl methacrylate resin and polyethylene wax can be used. Alternatively, as the protective release layer 19, it is possible to use a layer obtained by forming a coated film made of a mixture of cellulose acetate resin and thermosetting resin such as epoxy resin, phenol resin, thermosetting acrylic resin or melamine resin, and then thermosetting the coated film.

The protective release layer 19 may be omitted. Alternatively, instead of the protective release layer 19, a release layer may be interposed between the support layer 21a and the carrier layer 13.

The release layer is a layer for promoting the peeling of the optical device 1 from the support layer 21a. Different from the protective release layer 19, the release layer remains on the support layer 21a when the optical device 1 is peeled off from the support layer 21a. As the material of the release layer, for example, silicone resin or fluorocarbon resin can be used.

The support layer 21a releasably supports the front surface of the optical device 1. The support layer 21a has a sufficient strength against the heat, pressure, etc. applied on the transfer. As the support layer 21a, for example, a polyethylene terephthalate (PET) layer, polyethylene naphthalate layer or polyimide layer can be used. In the case of transferring the optical device 1 onto a surface having a three-dimensional structure, it is possible to use as the support layer 21a a layer which becomes soft by heating. As such a layer, for example, a polyethylene layer, polypropylene layer, vinyl chloride layer or amorphous PET layer can be used.

Figure 15:
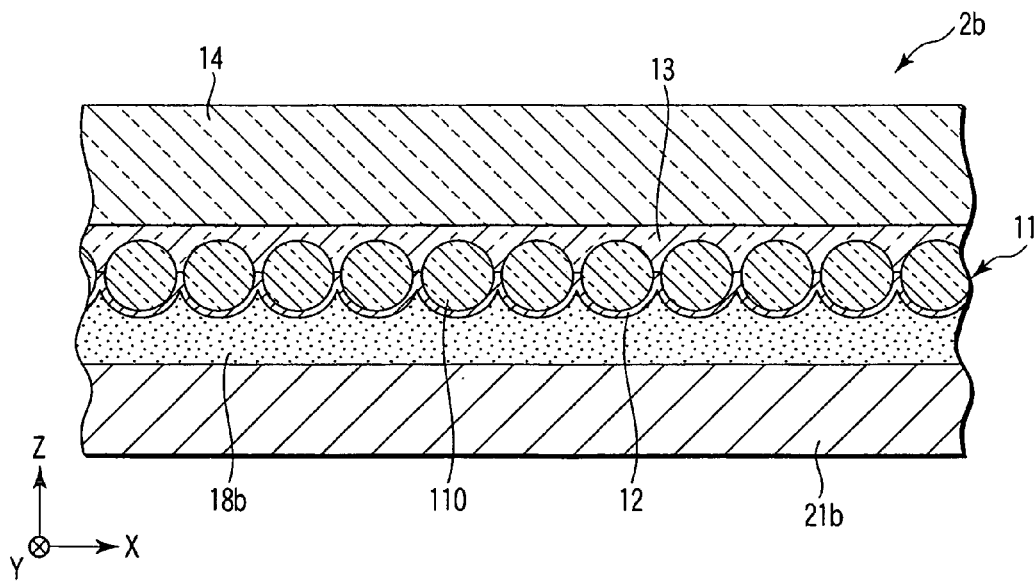
FIG. 15 is a sectional view schematically showing another example of a laminate which includes an optical device.

FIG. 15 is a sectional view schematically showing another example of a laminate which includes an optical device.

The laminate 2b shown in FIG. 15 is a peel-off label. The transfer foil 2a includes a optical device 1 and a support layer 21b.

The optical device 1 is the same as that described with reference to FIGS. 1 and 2 except for employing the following structure. That is, the optical device 1 is an adhesive label which further includes the substrate 13 and a pressure-sensitive adhesive layer 18b. The pressure-sensitive adhesive layer 18b is made of a pressure-sensitive adhesive. The pressure-sensitive adhesive layer 18b covers the back surface of the reflecting layer 12.

The optical device 1 may be provided with a notch or perforation so that it causes brittle fracture when it is fraudulently peeled off from an article. The optical device 1 may also include a part where the interlaminer strength is low.

The support layer 21b releasably supports the back surface of the optical device 1. The support layer 21a is, for example, a release paper.

The transfer foil 2a and the peel-off label 2b can be used, for example, in manufacturing a labeled article. Note that the optical devices 1 of the transfer foil 2a and the peel-off label 2b can be modified, for example, as described with reference to FIGS. 1 to 13.

Figure 16:
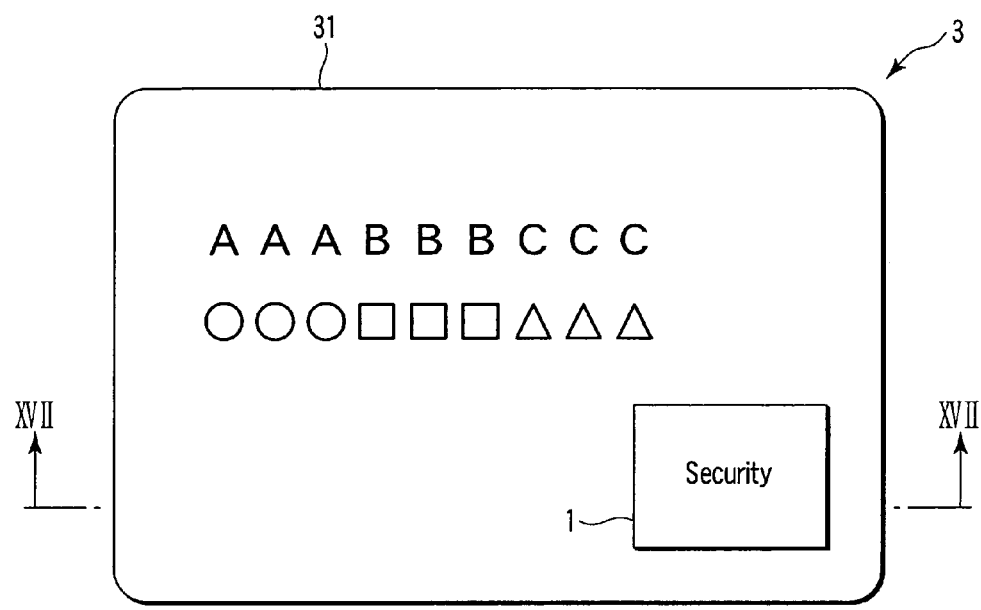
FIG. 16 is a plane view schematically showing an example of a labeled article.
Figure 17:
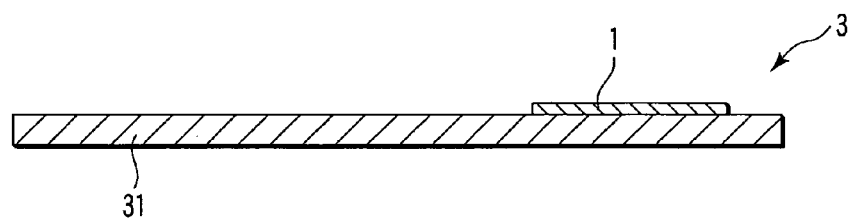
FIG. 17 is a sectional view taken along the line XVII-XVII of the labeled article shown in FIG. 16.

FIG. 16 is a plane view schematically showing an example of a labeled article. FIG. 17 is a sectional view taken along the line XVII-XVII of the labeled article shown in FIG. 16.

The labeled article 3 includes the optical device 1 described with reference to FIGS. 1 to 13 and an article 31.

The article 31 is an article whose genuineness is to be verified. The article 31 is, for example, an authentication medium such as cash card, credit card and passport, or a marketable security medium such as gift certificate and stock certificate. Typically, the article 31 is a printed matter. The article 31 may be an article other than the authentication medium and marketable security. For example, the article 31 may be a craft product or an art object. Alternatively, the article 31 is a package including a packaging material and an object contained therein.

In the case where the article 31 is a printed matter, as the material of the article 31, for example, a resin superior in a heat-resisting property can be used. As such a resin, for example, polyethylene naphthalate, polyimide, polyethylene, polypropylene or vinyl chloride can be used.

The optical device 1 is supported by the article 31. For example, the optical device 1 is adhered to the article 510. In this case, the optical device 1 can be supported by the article 31, for example, using the transfer foil 2a shown in FIG. 14 or the peel-off label 2b shown in FIG. 15.

Instead of using the adhesive layer 18a or the pressure-sensitive adhesive 18b for making the optical device 1 supported by the article, it may be supported by the article using other methods.

Note that in the labeled article 3, the optical device 1 further includes a printed layer. The printed layer may be a continuous layer or be patterned. The optical device 1 shown in FIG. 16 includes a printed pattern which displays a character string "Security".

Figure 18:
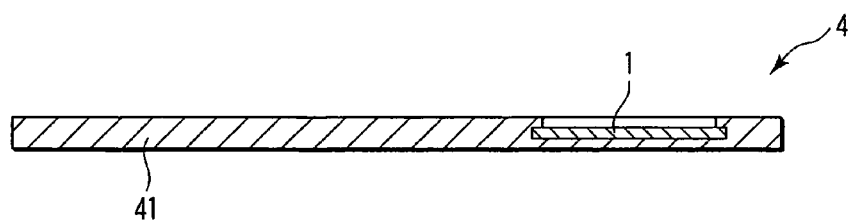
FIG. 18 is a plane view schematically showing another example of a labeled article.

FIG. 18 is a plane view schematically showing another example of a labeled article.

The labeled article 4 includes a paper 41 and the optical device 1 embedded in the paper 41. The labeled article 4 can be obtained, for example, by sandwiching the optical device 1 between layers of fibers during paper making, and then performing printing onto the paper surface, etc., as needed. Note that in order to make it easy to visually recognize the image displayed on the optical device 1, an opening may be provided at the portion of the paper that covers the front surface of the optical device. There is no limitation on the shape of the optical device 1 embedded in the paper. For example, a thread or strip-shaped optical device 1 may be embedded in the paper.

The optical device 1 may be used in the form of ink.

FIG. 19 is a sectional view schematically showing an example of an ink. In FIG. 19, the reference symbol 6 indicates a container containing ink 5.

The ink 5 includes a liquid binder resin 51 and the optical devices 1. The optical devices 1 have been broken into pieces and are dispersed in the binder resin. As the binder resin, for example, a printing binder or vehicle can be used.

The printed pattern obtained using this ink 5 includes the optical devices 1. Therefore, this printed pattern offers the above visual effect that described for the optical device 1.

In the case where the optical devices 1, which have been broken into pieces, are used, there is a possibility that some of the optical devices face the back side of the article. In the case where the optical devices 1, which have been broken into pieces, are used, two optical devices 1 may be bonded together such that their back sides face each other as will be described below.

FIG. 20 is a sectional view schematically showing an optical device according to still another embodiment of the present invention.

The optical device 1 has a structure in which a front portion and a back portion are bonded together via an interlayer 18.

The interlayer 18 is made of an adhesive or pressure-sensitive adhesive.

Each of the front and back portions are the same as the optical device 1 described with reference to FIGS. 1 and 2 except for further including the substrate 14. The front and back portions are bonded together such that their reflecting layers 12 face each other.

Both surfaces of the optical device 1 are display surfaces. Therefore, in the case where such optical devices 1, which have been broken into pieces, are used, the display surfaces of almost all the optical devices 1 face the front side of the labeled article.

Examples of the present invention will be described below.

Example 1

An acrylic resin was applied to a PET film with a thickness of 25 μm using bar-coating. As the acrylic resin, used was BMW6110 manufactured by TOYO INK MFG. CO., LTD. The coated film was formed to have a thickness of 0.2 μm after drying.

The coated film was heated in an oven set at 120° C. for 3 minutes, and then dispersed on the coated film was spherical transparent particles having diameters of about 300 nm and made of polystyrene. As the transparent particles, 3300B manufactured by MORITEX CORP. was used. Spray coating was used for dispersing the transparent particles. 90% or more of the transparent particles had particle diameters 0.8 times or more and 1.2 times or less of the average particle diameter.

The coated film on which the transparent particles were dispersed was further heated in the oven set at 120° C. for 30 seconds, and then the transparent particles not fixed on the coated film were removed using a vacuum cleaner. The transparent particles remained on the coated film formed a monolayer having a filling factor of 50% or more.

Thereafter, an aluminum layer with a thickness of 80 nm was formed on the particulate layer using vacuum evaporation. Thus, an optical device was obtained. Note that the front surface of this optical device is a surface of the PET film.

The optical device was observed from the front while illuminating its front surface with a white light. In this case, the optical device displayed a dark red-purple image regardless of the illumination direction.

Then, the optical device was observed in a direction within the negative angular range while obliquely illuminating its front surface with the white light. In the case where the observation angle was −45° or less, the optical display displayed an image which had colors ranging from blue to green due to diffracted lights. Note that 80% or more of the diffracted lights were TE polarized light, i.e., s-polarized light.

Next, a polarizing film was adhered on the aluminum layer of the optical device via an acrylic pressure-sensitive adhesive such that the polarizing film covers only a part of the aluminum layer. Thus, an optical device including a polarizer was obtained.

The optical device was observed from the front while illuminating its front surface with a white light. In this case, a first portion of the optical device in which the polarizing film was not adhered displayed a dark red-purple image. On the other hand, a second portion of the optical device in which the polarizing film was adhered displayed a dark red-purple image. Although the image displayed on the second portion had a color darker than that displayed on the first portion, it was difficult to discriminate them from each other.

Then, the optical device was observed in a direction within the negative angular range while illuminating its front surface with the white light. In the case where the observation angle was −45° or less, the first portion displayed an image which had colors ranging from blue to green due to diffracted lights. On the other hand, the second portion displayed an image darker than that displayed on the first portion. Further, the optical device was rotated around its normal while the illumination direction and the observation direction were kept unchanged. As a result, the difference in brightness between the first and second portions was changed in accordance with the rotation of the optical device.

Example 2

Prepared was a fluid dispersion containing a solution of polyvinyl alcohol and spherical transparent particles having diameters of about 300 nm and made of polystyrene. As the solution of polyvinyl alcohol, PVAHC manufactured by KURARAY CO., LTD. was used. As the transparent particles, 3300B manufactured by MORITEX CORP. was used. A mass ratio of polyvinyl alcohol with respect to the spherical particles was 1/20.

Then, the fluid dispersion was applied to a PET film with a thickness of 25 μm using bar-coating. The coated film was heated in an oven set at 120° C. for 3 minutes, and then excess transparent particles were removed using a vacuum cleaner. The transparent particles remained on the coated film formed a monolayer having a filling factor of 50% or more.

Thereafter, an aluminum layer with a thickness of 80 nm was formed on the particulate layer using vacuum evaporation. Thus, an optical device was obtained. Note that the front surface of this optical device is a surface of the PET film.

The optical device was observed from the front while illuminating its front surface with a white light. In this case, the optical device displayed a dark green image regardless of the illumination direction.

Then, the optical device was observed in a direction within the negative angular range while obliquely illuminating its front surface with the white light. In the case where the observation angle was −45° or less, the optical display displayed an image which had colors ranging from blue to green due to diffracted lights. Note that 80% or more of the diffracted lights were TE polarized light, i.e., s-polarized light.

Next, polyimide was applied to the aluminum layer of the optical device. The coated film was dried and then subjected to rubbing processing to obtain an alignment layer. Specifically, a part of the coated film and another part of the coated film were rubbed in different directions. A rayon cloth was used for the rubbing processing.

Then, prepared was a composition containing a dichromatic dye and a polymerizable nematic liquid crystal material. The composition was prepared such that low transmittances were achieved over the visible range. The composition was applied to the alignment layer, and subsequently the coated film was hardened to obtain a polarizing layer.

Thus, an optical device was obtained. Note that the front surface of the optical device is the surface of the polarizing layer.

The optical device was observed from the front while illuminating its front surface with a white light. In this case, it was impossible to discriminate, the two portions of the optical device having different rubbing directions from each other.

Then, the optical device was observed in a direction within the negative angular range while obliquely illuminating its front surface with the white light. In the case where the observation angle was −45° or less, the two portions of the optical device having different rubbing directions were seen to be different from each other in brightness. Further, the optical device was rotated around its normal while the illumination direction and the observation direction were kept unchanged. As a result, the bright and dark images changed their places between the two portions.

Example 3

An optical device including a polarizer was manufactured by the same method as described in Example 1 except that transparent particles with diameters of about 150 nm were used.

The optical device was observed in a direction within the negative angular range while obliquely illuminating its front surface with the white light and rotating the optical device around its normal. However, almost no change was caused in the difference in brightness between the first and second portions

Example 4

An acrylic resin was applied to a PET film with a thickness of 25 μm using bar-coating. As the acrylic resin, used was BMW6110 manufactured by TOYO INK MFG. CO., LTD. The coated film was formed to have a thickness of 0.2 μm after drying.

The coated film was heated in an oven set at 80° C. for 1 minute, and then dispersed on the coated film was spherical transparent particles having diameters of about 500 nm and made of polystyrene. As the transparent particles, 3500B manufactured by MORITEX CORP. was used. Spray coating was used for dispersing the transparent particles. 90% or more of the transparent particles had particle diameters 0.8 times or more and 1.2 times or less of the average particle diameter.

The coated film on which the transparent particles were dispersed was further heated in the oven set at 80° C. for 1 minute, and then the transparent particles not fixed on the coated film were removed using a vacuum cleaner. The transparent particles remained on the coated film formed a monolayer having a filling factor of 50% or more.

Thereafter, an aluminum layer with a thickness of 80 nm was formed on the particulate layer using vacuum evaporation. Thus, an optical device was obtained. Note that the front surface of this optical device is a surface of the PET film.

The optical device was observed from the front while illuminating its front surface with a white light. In this case, the optical device displayed a dark blue-green image regardless of the illumination direction.

Then, the optical device was observed in a direction within the negative angular range while obliquely illuminating its front surface with the white light. In the case where the observation angle was less than −30°, the optical display displayed an image which had colors ranging from blue to red due to diffracted lights.

Example 5

Prepared was a fluid dispersion containing a solution of polyvinyl alcohol and spherical transparent particles having diameters of about 500 nm and made of polystyrene. As the solution of polyvinyl alcohol, PVAHC manufactured by KURARAY CO., LTD. was used. As the transparent particles, 3500B manufactured by MORITEX CORP. was used. A mass ratio of polyvinyl alcohol with respect to the spherical particles was 1/20.

Then, the fluid dispersion was applied to a PET film with a thickness of 25 μm using bar-coating. The coated film was heated in an oven set at 80° C. for 1 minute, and then excess transparent particles were removed using a vacuum cleaner. The transparent particles remained on the coated film formed a monolayer having a filling factor of 50% or more.

Thereafter, an aluminum layer with a thickness of 80 nm was formed on the particulate layer using vacuum evaporation. Thus, an optical device was obtained. Note that the front surface of this optical device is a surface of the PET film.

The optical device was observed from the front while illuminating its front surface with a white light. In this case, the optical device displayed a dark blue-green image regardless of the illumination direction.

Then, the optical device was observed in a direction within the negative angular range while obliquely illuminating its front surface with the white light. In the case where the observation angle was less than −30°, the optical display displayed an image which had colors ranging from blue to red due to diffracted lights.

Example 6

Prepared was a fluid dispersion containing a solution of polyvinyl alcohol and spherical transparent particles having diameters of about 300 nm and made of polystyrene. As the solution of polyvinyl alcohol, PVAHC manufactured by KURARAY CO., LTD. was used. As the transparent particles, 3300B manufactured by MORITEX CORP. was used. A mass ratio of polyvinyl alcohol with respect to the spherical particles was 1/20.

Then, the fluid dispersion was applied to a PET film with a thickness of 25 μm using bar-coating. The coated film was heated in an oven set at 80° C. for 1 minute, and then excess transparent particles were removed using a vacuum cleaner. The transparent particles remained on the coated film formed a monolayer having a filling factor of 50% or more.

Thereafter, an aluminum layer with a thickness of 80 nm was formed on the particulate layer using vacuum evaporation. Thus, an optical device was obtained. Note that the front surface of this optical device is a surface of the PET film.

The optical device was observed from the front while illuminating its front surface with a white light. In this case, the optical device displayed a dark purple-blue image regardless of the illumination direction.

Then, the optical device was observed in a direction within the negative angular range while obliquely illuminating its front surface with the white light. In the case where the observation angle was less than −45°, the optical display displayed an image which had colors ranging from blue to green due to diffracted lights.

Example 7

Prepared was a fluid dispersion containing a solution of polyvinyl alcohol and spherical transparent particles having diameters of about 500 nm and made of polystyrene. As the solution of polyvinyl alcohol, PVAHC manufactured by KURARAY CO., LTD. was used. As the transparent particles, 3500B manufactured by MORITEX CORP. was used. A mass ratio of polyvinyl alcohol with respect to the spherical particles was 1/20.

Then, the fluid dispersion was applied to a PET film with a thickness of 25 μm using bar-coating. The coated film was heated in an oven set at 80° C. for 1 minute, and then excess transparent particles were removed using a vacuum cleaner. The transparent particles remained on the coated film formed a monolayer having a filling factor of 50% or more.

Thereafter, a titanium oxide layer with a thickness of 50 nm was formed on the particulate layer using vacuum evaporation. Thus, a transparent optical device was obtained. Note that the front surface of this optical device is a surface of the PET film.

The optical device was observed from the front while illuminating its front surface with a white light. In this case, the optical device displayed a dark blue-green image regardless of the illumination direction.

Then, the optical device was observed in a direction within the negative angular range while obliquely illuminating its front surface with the white light. In the case where the observation angle was less than −30°, the optical display displayed an image which had colors ranging from blue to red due to diffracted lights.

Example 8

Prepared was a fluid dispersion containing a solution of polyvinyl alcohol, first transparent particles having diameters of about 200 nm, second transparent particles having diameters of about 300 nm, and third transparent particles having diameters of about 400 nm. The mass ratio of polyvinyl alcohol, the first transparent particles, the second transparent particles, and the third transparent particles was 1:5:10:5. As the solution of polyvinyl alcohol, PVAHC manufactured by KURARAY CO., LTD. was used. As the first transparent particles, 3200B manufactured by MORITEX CORP. was used. As the second transparent particles, 3300B manufactured by MORITEX CORP. was used. As the third transparent particles, 3400B manufactured by MORITEX CORP. was used. The first to third particles are spherical particles made of polystyrene.

Note that the average particle diameter of the transparent particles contained in the fluid dispersion was about 300 nm. Note also that 50% of the transparent particles had particle diameters 0.8 times or more and 1.2 times or less of the average particle diameter.

Then, the fluid dispersion was applied to a PET film with a thickness of 25 μm using bar-coating. The coated film was heated in an oven set at 80° C. for 1 minute, and then excess transparent particles were removed using a vacuum cleaner. The transparent particles remained on the coated film formed a monolayer having a filling factor of 50% or more.

Thereafter, an aluminum layer with a thickness of 80 nm was formed on the particulate layer using vacuum evaporation. Thus, an optical device was obtained. Note that the front surface of this optical device is a surface of the PET film.

The optical device was observed in the normal and oblique directions while illuminating its front surface with a white light. As a result, the optical display displayed a gray image regardless of the illumination and observation direction.

Example 9

A solution of polyvinyl alcohol was mixed with spherical transparent particles having diameters of about 300 nm and made of polystyrene such that a mass ratio of polyvinyl alcohol with respect to the spherical particles was 1/20. As the solution of polyvinyl alcohol, PVAHC manufactured by KURARAY CO., LTD. was used. As the transparent particles, 3300B manufactured by MORITEX CORP. was used. The mixed solution was diluted with distilled water at a 4-fold dilution factor to obtain a fluid dispersion.

Then, the fluid dispersion was applied to a PET film with a thickness of 25 μm using bar-coating. The coated film was heated in an oven set at 80° C. for 1 minute, and then excess transparent particles were removed using a vacuum cleaner. The transparent particles remained on the coated film formed a monolayer having a filling factor of 25%.

Thereafter, an aluminum layer with a thickness of 80 nm was formed on the particulate layer using vacuum evaporation. Thus, an optical device was obtained. Note that the front surface of this optical device is a surface of the PET film.

The optical device was observed in the normal and oblique directions while illuminating its front surface with a white light. As a result, the optical display displayed a gray image regardless of the illumination and observation direction.

Example 10

Prepared was a fluid dispersion containing a solution of polyvinyl alcohol and spherical transparent particles having diameters of about 500 nm and made of polystyrene. As the solution of polyvinyl alcohol, PVAHC manufactured by KURARAY CO., LTD. was used. As the transparent particles, 3500B manufactured by MORITEX CORP. was used. A mass ratio of polyvinyl alcohol with respect to the spherical particles was 1/20.

Then, the fluid dispersion was applied to a PET film with a thickness of 25 μm using bar-coating. The coated film was heated in an oven set at 80° C. for 1 minute, and then excess transparent particles were removed using a vacuum cleaner. The transparent particles remained on the coated film formed a monolayer having a filling factor of 50% or more.

Thereafter, an aluminum layer with a thickness of 50 nm was formed on the particulate layer using vacuum evaporation. Thus, an optical device was obtained. Note that the front surface of this optical device is a surface of the PET film.

The spectral transmission characteristics of the optical device were determined. As a result, the optical device had transmittances of about 15% over the whole wavelength range of 400 nm to 700 nm.

The optical device was adhered to a printed patter via an acrylic pressure-sensitive adhesive such that the back surface of the optical device faced the front surface of the printed matter. Note that no printed pattern of the printed patter could be seen through the optical device.

Next, the optical device was observed from the front while illuminating its front surface with a white light. In this case, the optical device displayed a dark blue-green image regardless of the illumination direction.

Then, the optical device was observed in a direction within the negative angular range while obliquely illuminating its front surface with the white light. In the case where the observation angle was less than −30°, the optical display displayed an image which had colors ranging from blue to red due to diffracted lights.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An optical device comprising:
a light-reflecting interface provided with a first relief structure including first recesses or protrusions arranged two-dimensionally, the first relief structure emitting a first diffracted light when illuminated with a light, wherein each of the first recesses or protrusions has a shape which is the same as a part of a surface of a sphere; and
a light-transmitting interface disposed in front of the light-reflecting interface and having a reflectance smaller than that of the first interface, the light-transmitting interface being provided with a second relief structure including second recesses or protrusions arranged two-dimension- ally, and the second relief structure emitting a second diffracted light when illuminated with the light, wherein each of the second recesses or protrusions has a shape which is the same as a part of a surface of a sphere.

2. A laminate comprising:
an optical device including:
- a light-reflecting interface provided with a first relief structure including first recesses or protrusions arranged two-dimensionally, the first relief structure emitting a first diffracted light when illuminated with a light, wherein each of the first recesses or protrusions has a shape which is the same as a part of a surface of a sphere; and
- a light-transmitting interface disposed in front of the light-reflecting interface and having a reflectance smaller than that of the first interface, the light-transmitting interface being provided with a second relief structure including second recesses or protrusions arranged two-dimensionally, and the second relief structure emitting a second diffracted light when illuminated with the light, wherein each of the second recesses or protrusions has a shape which is the same as a part of a surface of a sphere; and a support facing the light-reflecting interface with the light-transmitting interface interposed therebetween and releasably supporting the optical device.

3. A labeled article comprising:
an optical device including:
- a light-reflecting interface provided with a first relief structure including first recesses or protrusions arranged two-dimensionally, the first relief structure emitting a first diffracted light when illuminated with a light, wherein each of the first recesses or protrusions has a shape which is the same as a part of a surface of a sphere; and
- a light-transmitting interface disposed in front of the light-reflecting interface and having a reflectance smaller than that of the first interface, the light-transmitting interface being provided with a second relief structure including second recesses or protrusions arranged two-dimensionally, and the second relief structure emitting a second diffracted light when illuminated with the light, wherein, each of the second recesses or protrusions has a shape which is the same as a part of a surface of a sphere; and an article facing the light-transmitting interface with the light-reflecting interface interposed therebetween and supporting the optical device.

* * * * *